UNITED STATES PATENT OFFICE.

FRITZ HOFMANN AND CARL COUTELLE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

CAOUTCHOUC SUBSTANCE AND PROCESS OF MAKING SAME.

1,084,333.     Specification of Letters Patent.     Patented Jan. 13, 1914.

No Drawing.     Application filed November 28, 1910. Serial No. 594,557.

*To all whom it may concern:*

Be it known that we, FRITZ HOFMANN and CARL COUTELLE, doctors of philosophy, chemists, citizens of the German Empire, residing at Elberfeld, Germany, have invented new and useful Improvements in Caoutchouc Substances and Processes of Making Same, of which the following is a specification.

We have found that the hydrocarbon known as alpha-methylbutadiene:

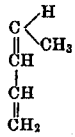

is converted by polymerization into a new caoutchouc substance, which may replace natural caoutchouc in its chemical and technical applications.

The process for producing the new caoutchouc substance consists in heating this hydrocarbon in an appropriate manner so that the new caoutchouc substance is mainly produced.

The process may also be carried out in the presence of agents which promote polymerization, such as acetic acid, acetic acid anhydrid, butyric acid, creosote, or which act as diluents.

In order to illustrate our invention the following example is given, the parts being by weight: Alpha-methylbutadiene is heated in an autoclave to 70° C. until a test sample after distillation leaves a residue behind which is insoluble in alcohol but soluble in coal tar benzene. When this state is reached, the whole mass is distilled. A jelly-like mass is thus obtained, which is heated first in a water bath and then in gradually increased *vacuo* in an oil bath to 150° C. whereupon our new product in the form of an elastic substance is obtained which is left behind as a residue. It forms an elastic whitish mass insoluble in alcohol and soluble in benzene. It forms a nitrosite which is a yellowish powder which becomes brown and is decomposed on being heated to 160–165° C. Its brom addition product is a yellowish-white amorphous compound which becomes brown and is decomposed on being heated to from 140–150° C. Its ozonid is an oil which detonates when heated. Hydrogen peroxid is produced on heating the ozonid with water. The formation of hydrogen peroxid can be proved by the known test with titanic acid. It is in the vulcanized form a whitish not adhesive product.

Our method of polymerization may also be applied to mixtures of alpha-methylbutadiene and hydrocarbons of the erythrene series and of similar groups in various proportions and the thus formed mixtures of new caoutchouc substances may be employed in the arts.

Our new caoutchouc substance described herein may be vulcanized and such vulcanized caoutchouc substance may be used in the same manner as vulcanized natural caoutchouc. We can also use a mixture of our new caoutchouc substance described herein with any other caoutchouc substance for example with those described in our other applications Ser. Nos. 578,607, 578,608, 588,173 in which we claim the polymerization of erythrene, isoprene and polymethyl-substituted erythrenes and subject this mixture to vulcanization, or we may mix our new caoutchouc substance with natural caoutchouc and subject this mixture to vulcanization.

The ozonid upon decomposition with water yields a plurality of oxygen-containing decomposition products among which is found the 2-methyl-succinic aldehyde of the following graphically represented formula:

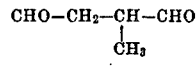

We claim:

1. The process of producing a caoutchouc-like substance from alpha-methylbutadiene which comprises heating alpha-methylbutadiene under caoutchouc-forming conditions until a product results insoluble in alcohol.

2. The process of producing a caoutchouc-like substance which comprises polymerizing alpha-methylbutadiene in the presence of an agent which promotes the polymerization until a caoutchouc-like product results insoluble in alcohol.

3. The process of producing a caoutchouc-like substance which comprises polymerizing alpha-methylbutadiene by heating in the presence of an agent which promotes the polymerization until a caoutchouc-like product results insoluble in alcohol.

4. The process of producing a caoutchouc-like substance which comprises polymerizing alpha-methylbutadiene by heating in the presence of an agent of acid reaction.

5. The process of producing a caoutchouc-like substance which comprises polymerizing alpha-methylbutadiene by heating until a caoutchouc-like product results insoluble in alcohol, and separating the caoutchouc-like substance from the resulting product.

6. The process of producing a caoutchouc-like substance which comprises polymerizing alpha-methylbutadiene by heating until a caoutchouc-like product results insoluble in alcohol and separating the volatile constituents from the resulting product by distillation.

7. As a new product a caoutchouc-like substance comprising the caoutchouc-like polymerization product of alpha-methylbutadiene, which product is insoluble in alcohol but soluble in coal-tar benzene, and which product forms an ozonid which yields upon decomposition with water a plurality of decomposition products including 2-methyl-succinic aldehyde.

8. As a new product alpha-methylbutadiene caoutchouc obtained by polymerization of alpha-methylbutadiene which is characterized by being a whitish substance forming a nitrosite which is a yellowish powder which becomes brown and is decomposed on being heated to 160–165° C.; forming a brom addition product which is a yellowish-white amorphous compound which becomes black and is decomposed on being heated to 140–150° C., forming an ozonid which is an oil detonating when heated, the ozonid yielding upon decomposition with water 2-methyl-succinic aldehyde; and in the vulcanized form is a whitish not adhesive product, substantially as described.

In testimony whereof we have hereunto set our hands in the presence of two subscribing witnesses.

FRITZ HOFMANN. [L. S.]
CARL COUTELLE. [L. S.]

Witnesses:
CHAS. J. WRIGHT,
WALTER VONNEGUT.